(12) United States Patent
Sun

(10) Patent No.: US 9,145,328 B2
(45) Date of Patent: Sep. 29, 2015

(54) OPTICAL GLASS AND OPTICAL ELEMENT

(75) Inventor: Wei Sun, Sichuan (CN)

(73) Assignee: CDGM GLASS CO., LTD, Chengdu, Sichuan (CN)

( * ) Notice: Subject to any disclaimer, the term of this patent is extended or adjusted under 35 U.S.C. 154(b) by 0 days.

(21) Appl. No.: 14/343,559

(22) PCT Filed: Sep. 6, 2012

(86) PCT No.: PCT/CN2012/081040
§ 371 (c)(1),
(2), (4) Date: Mar. 7, 2014

(87) PCT Pub. No.: WO2013/034082
PCT Pub. Date: Mar. 14, 2013

(65) Prior Publication Data
US 2014/0221191 A1    Aug. 7, 2014

(30) Foreign Application Priority Data
Sep. 7, 2011   (CN) .......................... 2011 1 0263415

(51) Int. Cl.
C03C 3/066    (2006.01)
C03C 3/068    (2006.01)

(52) U.S. Cl.
CPC ................. *C03C 3/068* (2013.01); *C03C 3/066* (2013.01)

(58) Field of Classification Search
CPC ................................ C03C 3/068; C03C 3/066
USPC .................................................... 501/78, 79
See application file for complete search history.

(56) References Cited

U.S. PATENT DOCUMENTS

| | | | |
|---|---|---|---|
| 4,166,746 A * | 9/1979 | Ishibashi et al. | 501/42 |
| 4,226,627 A * | 10/1980 | Inoue et al. | 501/50 |
| 2009/0088310 A1 | 4/2009 | Suzuki et al. | |
| 2010/0081555 A1* | 4/2010 | Negishi et al. | 501/78 |
| 2011/0028300 A1* | 2/2011 | Zou et al. | 501/78 |

FOREIGN PATENT DOCUMENTS

| | | |
|---|---|---|
| CN | 102311229 A | 1/2012 |
| JP | 55-116641 A | 9/1980 |
| JP | 56-041850 A | 4/1981 |
| JP | 2006-117506 A | 5/2006 |
| JP | 2007-269584 A | 10/2007 |

OTHER PUBLICATIONS

International Search Report mailed Dec. 6, 2012; PCT/CN2012/081040.

* cited by examiner

*Primary Examiner* — Anthony J Green
*Assistant Examiner* — Elizabeth A Bolden
(74) *Attorney, Agent, or Firm* — Ladas & Parry LLP

(57) ABSTRACT

The present invention is aimed to provide a cost-effective optical glass with refractive index of 1.74-1.80 and Abbe number of 47-51 but containing no $Gd_2O_3$ and an optical element made hereof. The optical glass contains the following components according to percentage by weight: more than 2.7% but less than 10% of $SiO_2$, 20-31% of $B_2O_3$, 38-49% of $La_2O_3$, more than 12% but less than 20% of $Y_2O_3$, more than 1% but less than 4% of ZnO, more than 0.5% but less than 3% of $Nb_2O_5$, wherein the content of ZnO is more than that of $Nb_2O_5$, 0-5% of $Ta_2O_5$, 0-5% of RO, wherein the RO is one or more of CaO, SrO and MgO, and content of $ZrO_2$ is more than 6.7% but less than 15%. The present invention is a lanthanum borate glass containing no $Gd_2O_3$. A stable glass can be obtained by adjusting the content of $La_2O_3$, $B_2O_3$ and $Y_2O_3$.

12 Claims, No Drawings

OPTICAL GLASS AND OPTICAL ELEMENT

FIELD OF THE INVENTION

The present invention relates to an optical glass with refractive index of 1.74-1.80 and an Abbe number of 47-51 and an optical element made hereof.

BACKGROUND OF THE INVENTION

In recent years, with the increasing integrated level and rapidly increasing functions of the equipment applied in the optical system, the optical system is required to be more accurate, lighter and smaller. In order to meet the refractive index of 1.74 to 1.80 and Abbe number of 47 to 51, the optical glass is often $B_2O_3$—$La_2O$ series. Japanese patent application laid-open No. 2006-117506 discloses an optical glass with refractive index of 1.74-1.80 and Abbe number of 47-51. However, the optical glass contains 25-35% (by wt %, hereinafter the same) of $Gd_2O_3$. $Gd_2O_3$ is rare earth oxide and expensive so that the optical glass is featured in high cost.

SUMMARY OF THE INVENTION

The present invention is aimed to provide a cost-effective optical glass with refractive index of 1.74-1.80 and Abbe number of 47-51 but containing no $Gd_2O_3$ and an optical element made hereof.

The present invention solves the technical problem by the following technical solution: an optical glass containing the following components according to percentage by weight: more than 2.7% but less than 10% of $SiO_2$, 20-31% of $B_2O_3$, 38-49% of $La_2O_3$, more than 12% but less than 20% of $Y_2O_3$, more than 1% but less than 4% of ZnO, more than 0.5% but less than 3% of $Nb_2O_5$, wherein the content of ZnO is more than that of $Nb_2O_5$, 0-5% of $Ta_2O_5$, 0-5% of RO, wherein the RO is one or more of CaO, SrO and MgO, and content of $ZrO_2$ is more than 6.7% but less than 15%.

Further, the $SiO_2$: 3-9%.
Further, the $SiO_2$: 3-6%.
Further, the $La_2O_3$: 40-49%.
Further, the $La_2O_3$: 43-47%.
Further, the content of the $Y_2O_3$ is more than 12% but less than 17%.
Further, the content of the $Y_2O_3$ is more than 12% but less than 15%.
Further, the content of $ZrO_2$ is more than 6.7% but less than 12%.
Further, the content of $ZrO_2$ is more than 6.7% but less than 10%.
Further, the content of the ZnO is more than 1% but less than 2%.
Further, the content of the $Nb_2O_5$ is more than 0.5% but less than 2.5%.
Further, the optical element made of the above optical glass.

The beneficial effects of the present invention are as follows: the present invention is a lanthanum borate glass containing no $Gd_2O_3$. A stable glass can be obtained by adjusting the content of $La_2O_3$, $B_2O_3$ and $Y_2O_3$. Introduction of proper amount of $Y_2O_3$ can improve the transmittance, reduce the density, reduce the maximum crystallization temperature of the glass and make the glass formable; introduction of ZnO can improve the chemical stability of the glass and inhibit crystallization; introduction of small amount of $Nb_2O_5$ can adjust the Abbe number of the glass; and optical glass of said optical constants and good chemical stability can be get by adjusting the content of ZnO and $Nb_2O_5$. The optical glass of the present invention contains no $Gd_2O_3$ so that the cost is reduced. Experimental results show that the glass of the present invention is featured in refractive index of 1.74-1.80, Abbe number of 47-51, transmittance of below 370 nm, excellent transmittance and level I of resistance to acid and water so that it can meet the imaging requirements of the optical system and equipment.

EMBODIMENTS

The following is aimed to give complete and clear description of the technical solutions of the embodiments of the present invention. Obviously, the described embodiments are not all but only some of the embodiments of the present invention. Based on the embodiments of the present invention, all other embodiments obtained by technicians in this art without any creative effort shall belong to the protective scope of the present invention.

The optical glass of the present invention contains $SiO_2$, which can increase the mechanical strength of the glass material and make the glass material have good abrasion resistance and chemical resistance. In case that the content of $SiO_2$ is too low, the glass is unstable and is prone to crystallization. In case that the content of $SiO_2$ is too high, the glass will be refractory. Therefore, the amount of $SiO_2$ is more than 2.7% but less than 10%, preferably to be 3-9% and most preferably to be 3-6%.

As an effective oxide for forming glass network structure, $B_2O_3$ is also an effective ingredient for improving meltbility, reducing the melting temperature and reducing the viscous flow temperature of the glass. Meanwhile, it is still an essential component to realize the low dispersivity of glass of the present invention and it can also contribute to dissolution of $La_2O_3$. Too much $B_2O_3$ can not realize the high refractive index of the glass while too less $B_2O_3$ will make the glass unstable. Therefore, the content of $B_2O_3$ is 20-31%.

$La_2O_3$ is an important component to obtain glass of high refractive index and low dispersivity. Its amount is required to be 38-49%. In case that content is less than 38%, the refractive index and low dispersivity is decreased; in case that the content exceeds 49%, devitrification resistance is decreased, resulting in that it is difficult to prepare stable glass. Thus, the content is preferably 40-49% and more preferably 43-47%.

$Y_2O_3$ is an important component for preparing glass with high refractive index in the present invention in case that Abbe number is reduced. Introduction of proper amount of $Y_2O_3$ can improve the transmittance, reduce the density, reduce the maximum crystallization temperature of the glass and make the glass formable. Thus, the amount of $Y_2O_3$ is more than 12% but less than 20%, preferably more than 12% but less than 17% and most preferably more than 12% but less than 15%.

The present invention is a lanthanum borate glass containing no $Gd_2O_3$. A stable glass can be obtained by adjusting the content of $La_2O_3$, $B_2O_3$ and $Y_2O_3$.

Addition of $ZrO_2$ can realize the required refractive index. Addition of appropriate amount of $ZrO_2$ can not only improve impermeability resistance of the glass but also effectively improve the high-temperature viscosity and chemical stability of the glass. Therefore, the amount of $ZrO_2$ is more than 6.7%, or the effect can not be achieved. However, it should be less than 15%, or the glass is prone to crystallization. The content is preferably more than 6.7% but less than 12%, and more preferably more than 6.7% but less than 10%.

In the present invention, ZnO is also an essential component for preparing the glass of high refractive index and low dispersivity. It can not improve impermeability resistance of the glass, reduce its viscosity flow temperature, improve chemical stability of the glass and suppress crystallization. The addition amount should be more than 1%, otherwise the meltbility of the glass will be reduced and the chemical stability will be deteriorated; however, the content should be less than 4%, or it is unable to obtain the final product glass of low dispersivity of the present invention. The content is preferably more than 1% but less than 2%.

$Nb_2O_5$ is also an effective component to obtain glass of high refractive index. In the present invention, small amount of $Nb_2O_5$ is added in order to adjust the Abbe number of the glass and suppress crystallization. The addition amount is more than 0.5% but less than 3% and preferably more than 0.5% but less than 2.5%.

The content of the ZnO is more than that of $Nb_2O_5$.

Similar to $Nb_2O_5$, $Ta_2O_5$ is also a component with the effect of realizing high refractive index. Proper amount of $Ta_2O_5$ can be added to the present invention. Since it is expensive, the content should be controlled to be 0-5% and preferably 0%.

Small amount of RO can be added to the present invention, wherein the RO is one or more of CaO, SrO and MgO, in order to improve the meltbility of the glass, wherein its content is 0-5%.

No $Gd_2O_3$ is added to the present invention. The optical glass with refractive index of 1.74-1.80, Abbe number of 47-51 and level I of resistance to acid and water and other chemical stability properties can be obtained by adjusting the content of ZnO and $Nb_2O_5$, wherein the content of ZnO is more than that of $Nb_2O_5$.

According to the present invention, the optical glass is preferably prepared in the following steps:

Using oxide, hydroxide, carbonate or nitrate of the above components as raw materials, mixing and placing them into a platinum crucible to be melt, clarified and homogenized at 1200-1400° C. and preferably 1280-1350° C. to obtain molten glass; cooling the molten glass to below 1100° C. and then pouring it into preheated metal mold; performing extrusion forming on the molten glass in the metal mold at 650-750° C., and then performing anneal on the glass after extrusion forming to obtain optical glass.

Performance test is performed on the optical glass as follows:

The annealing value in case of refractive index (nd) of (−2° C./h)-(−6° C./h), refractive index and Abbe number should be tested in accordance with the test method for refractive index and dispersion coefficient of colorless optical glass specified in *GB/T 7962.1-1987*;

Density is tested according to *GB/T 7962.20-1987 Colorless Optical Glass Test Method-Density Test Method*.

The glass is made into a 10 mm±0.1 mm thick sample, wherein the wavelength of the tested glass should be λ70 in case of transmissivity of 70%.

According to GB/T 17129 test method, acid resistance and water resistance of the tested glass can be calculated.

Besides, the temperature gradient furnace method is adopted to measure the crystallization properties of the glass. The glass is made into 180*10*10 mm sample, with the side polished, and then is placed into temperature gradient furnace for insulation for 4 hours. Then, observe the crystallization of the glass under the microscope. The maximum temperature at which crystal appears on the glass should be the maximum crystallization temperature.

After testing, the optical glass of the present invention has the following properties:

The refractive index range is 1.74-1.80, Abbe number 47-51 density below 4.24 g/cm$^3$ and wavelength λ80 below 370 nm in case of 80% of transmissivity; the maximum devitrification temperature is below 1100° C.; and chemical stability and resistance to acid and water is level 1.

The optical glass of the present invention is featured in high refractive index, excellent transmission, good chemical stability and low density. The refractive index of the optical glass of the present invention is 1.74-1.80 and preferably 1.76-1.79; Abbe number is 47-51 and preferably 48.5-50.5; glass density is below 4.24 g/cm$^3$, preferably below 4.20 g/cm$^3$ and more preferably below 4.18 g/cm$^3$; wavelength λ70 is below 370 nm and preferably below 365 nm in case of transmissivity of 70%; the maximum devitrification temperature is below 1100° C. and preferably below 1050° C.; and chemical stability, acid resistance and alkali resistance reach level 1.

The present invention also provides an optical element made of the optical glass described in the above technical solutions in the method familiar to the technicians in the art. Since the optical glass is featured in high refractive index and low glass transition temperature, the optical element is also featured in high refractive index and low glass transition temperature and can be applied to digital cameras, digital video cameras, camera phones and other devices.

In order to further understand the technical solution of the present invention, the following describes the preferred embodiments of the present invention. It should be understood that the description merely aims to further illustrate the features and advantages of the present invention but not to limit the claims of the present invention.

The optical glass is prepared according to the mixture ratio of raw materials as shown in Table 1 in the following steps:

Fully mixing the raw materials described in Table 1, and then placing them in a platinum crucible to be melted, clarified and homogenized at 1300° C. to obtain molten glass;

Cooling the molten glass to below 1100° C. and then pouring it into preheated metal mold;

Performing extrusion forming on the molten glass in the metal mold at 700° C., and then performing anneal on the glass after extrusion forming to obtain optical glass.

Performance test is performed on the optical glass and the results are shown in Table 1. Table 1 shows the performance parameters of the optical glass of the embodiment of the present invention.

TABLE 1

Mixture ratio of raw materials for preparing the optical glass in embodiments 1 to 10 of the present invention

| | | Embodiments | | | | | | | | | |
|---|---|---|---|---|---|---|---|---|---|---|---|
| | | 1 | 2 | 3 | 4 | 5 | 6 | 7 | 8 | 9 | 10 |
| Glass | $SiO_2$ | 2.8 | 4.1 | 6.0 | 5.7 | 3.3 | 5.0 | 3.8 | 4.2 | 3.7 | 3.6 |
| Composition | $B_2O_3$ | 31 | 29 | 29.8 | 30 | 30.1 | 30.5 | 29.8 | 29.1 | 30.7 | 31 |
| (wt %) | $La_2O_3$ | 38 | 38.3 | 39.3 | 41 | 39 | 38.1 | 43.8 | 38.4 | 42.6 | 40.1 |

TABLE 1-continued

Mixture ratio of raw materials for preparing the optical glass in embodiments 1 to 10 of the present invention

|  |  | Embodiments | | | | | | | | | |
|---|---|---|---|---|---|---|---|---|---|---|---|
|  |  | 1 | 2 | 3 | 4 | 5 | 6 | 7 | 8 | 9 | 10 |
|  | $Y_2O_3$ | 13.7 | 18.6 | 12.4 | 12.4 | 13.5 | 14.3 | 12.4 | 13.2 | 13.0 | 12.3 |
|  | ZnO | 3.5 | 2.1 | 3.1 | 1.9 | 2.4 | 2.9 | 1.9 | 3.7 | 1.8 | 2.0 |
|  | $Nb_2O_5$ | 0.7 | 1.2 | 2.3 | 1.6 | 1.2 | 2.0 | 1.4 | 2.9 | 1.5 | 1.8 |
|  | $ZrO_2$ | 6.8 | 6.9 | 7.1 | 7.0 | 7.8 | 7.2 | 6.9 | 8.5 | 6.7 | 9.2 |
|  | $Ta_2O_5$ | 3.5 | 0 | 0 | 0.4 | 1.9 | 0 | 0 | 0 | 0 | 0 |
|  | RO | 0 | 0 | 0 | 0 | 0.8 | 0 | 0 | 0 | 0 | 0 |
|  | CaO | 0 | 0 | 0 | 0 | 0 | 0 | 0 | 0 | 0 | 0 |
|  | SrO | 0 | 0 | 0 | 0 | 0.8 | 0 | 0 | 0 | 0 | 0 |
|  | MgO | 0 | 0 | 0 | 0 | 0 | 0 | 0 | 0 | 0 | 0 |
|  | Total | 100 | 100 | 100 | 100 | 100 | 100 | 100 | 100 | 100 | 100 |
| Performance Parameters | Refractive index | 1.7590 | 1.7612 | 1.7720 | 1.7905 | 1.7690 | 1.7723 | 1.7740 | 1.7811 | 1.7829 | 1.7689 |
|  | Abbe number | 48.3 | 48.9 | 49.1 | 49.9 | 48.8 | 49.6 | 49.7 | 48.6 | 47.5 | 50.1 |
|  | Density ($g/cm^3$) | 4.24 | 4.22 | 4.20 | 4.19 | 4.23 | 4.24 | 4.23 | 4.22 | 4.20 | 4.23 |
|  | $\lambda 80$ (nm) | 370 | 369 | 366 | 368 | 365 | 370 | 370 | 369 | 368 | 370 |
|  | Maximum crystallization temperature (° C.) | 1100 | 1080 | 1080 | 1090 | 1100 | 1050 | 1100 | 1090 | 1080 | 1100 |
|  | Resistance to acid | Level 1 | Level 1 | Level 1 | Level 1 | Level 1 | Level 1 | Level 1 | Level 1 | Level 1 | Level 1 |
|  | Resistance to alkali | Level 1 | Level 1 | Level 1 | Level 1 | Level 1 | Level 1 | Level 1 | Level 1 | Level 1 | Level 1 |

It can be seen from Table 1 that the optical glass of the present invention is featured in high refractive index, good chemical stability, low density and excellent transmission performance.

The above description of the disclosed embodiments enables the professional and technical personnel in this art to realize or use the present invention. Various modifications to these embodiments are apparent to the skilled technicians in this art. The general principles defined herein may be realized in other embodiments without departing from the spirit or scope of the present invention. Accordingly, the present invention will not be limited to these embodiments shown herein and will meet the broadest range consistent with the principles and novel features disclosed herein.

The invention claimed is:

1. An optical glass is characterized in that it comprises the following components according to percentage by weight: more than 2.7% but less than 10% of $SiO_2$, 20-31% of $B_2O_3$, 38-49% of $La_2O_3$, more than 12% but less than 20% of $Y_2O_3$, more than 1% but less than 4% of ZnO, more than 0.5% but less than 3% of $Nb_2O_5$, wherein the content of ZnO is more than that of $Nb_2O_5$, 0-5% of $Ta_2O_5$, 0-5% of RO, wherein the RO is one or more of CaO, SrO and MgO, and content of $ZrO_2$ is more than 6.7% but less than 15%.

2. The optical glass according to claim 1 wherein the content of $SiO_2$ is 3-9%.

3. The optical glass according to claim 1 wherein the content of $SiO_2$ is 3-6%.

4. The optical glass according to claim 1 wherein the content of $La_2O_3$ is 40-49%.

5. The optical glass according to claim 1, wherein the content of $La_2O_3$ is 43-47%.

6. The optical glass according to claim 1, wherein the content of $Y_2O_3$ is more than 12% but less than 17%.

7. The optical glass according to claim 1 wherein the content of $Y_2O_3$ is more than 12% but less than 15%.

8. The optical glass according to claim 1 wherein the content of $ZrO_2$ is more than 6.7% but less than 12%.

9. The optical glass according to claim 1, wherein the content of $ZrO_2$ is more than 6.7% but less than 10%.

10. The optical glass according to claim 1 wherein the content of ZnO is more than 1% but less than 2%.

11. The optical glass according to claim 1 wherein the content of $Nb_2O_5$ is more than 0.5% but less than 2.5%.

12. An optical element made of the optical glass according to claim 1.

* * * * *